US010249396B2

(12) United States Patent
Miguirditchian et al.

(10) Patent No.: US 10,249,396 B2
(45) Date of Patent: Apr. 2, 2019

(54) METHOD FOR THE TREATMENT OF AN AQUEOUS NITRIC SOLUTION RESULTING FROM DISSOLVING SPENT NUCLEAR FUEL, SAID METHOD BEING PERFORMED IN A SINGLE CYCLE AND WITHOUT REQUIRING ANY OPERATION INVOLVING REDUCTIVE STRIPPING OF PLUTONIUM

(71) Applicants: COMMISSARIAT A L'ENERGIE ATOMIQUE ET AUX ENERGIES ALTERNATIVES, Paris (FR); AREVA NC, Courbevoie (FR)

(72) Inventors: Manuel Miguirditchian, Avignon (FR); Christian Sorel, Villeneuve les Avignon (FR); Sylvain Costenoble, Bagnols sur Cèze (FR); Vincent Vanel, Les Angles (FR); Xavier Heres, Avignon (FR); Pascal Baron, Bagnols sur Cèze (FR); Michel Masson, Avignon (FR); Laurence Chareyre, Saint Just d' Ardeche (FR)

(73) Assignees: COMMISSARIAT A L'ENERGIE ATOMIQUE ET AUX ENERGIES ALTERNATIVES, Paris (FR); ORANO CYCLE, Courbevoie (FR)

( * ) Notice: Subject to any disclaimer, the term of this patent is extended or adjusted under 35 U.S.C. 154(b) by 0 days.

(21) Appl. No.: 15/747,713

(22) PCT Filed: Jul. 28, 2016

(86) PCT No.: PCT/EP2016/068040
§ 371 (c)(1),
(2) Date: Jan. 25, 2018

(87) PCT Pub. No.: WO2017/017207
PCT Pub. Date: Feb. 2, 2017

(65) Prior Publication Data
US 2018/0218798 A1 Aug. 2, 2018

(30) Foreign Application Priority Data
Jul. 29, 2015 (FR) ...................... 15 57263

(51) Int. Cl.
G21C 19/00 (2006.01)
G21C 19/46 (2006.01)
C22B 3/32 (2006.01)
C22B 60/02 (2006.01)

(52) U.S. Cl.
CPC ............ *G21C 19/46* (2013.01); *C22B 3/0024* (2013.01); *C22B 60/026* (2013.01); *Y02W 30/883* (2015.05)

(58) Field of Classification Search
CPC ... C07C 233/05; C07C 231/02; C22B 3/0024; C22B 60/026; C22B 60/0239; C22B 60/04; G21C 19/46; Y02W 30/883
USPC .......................................................... 423/9
See application file for complete search history.

(56) References Cited

U.S. PATENT DOCUMENTS

| 4,772,429 | A | 9/1988 | Descouls et al. |
| 5,132,092 | A | 7/1992 | Musikas et al. |
| 8,795,610 | B2 | 8/2014 | Saudray et al. |
| 8,795,611 | B2 * | 8/2014 | Miguirditchian ..... C22B 3/0024 423/9 |
| 2007/0290178 | A1 | 12/2007 | Baron et al. |
| 2012/0128555 | A1 | 5/2012 | Emin et al. |
| 2013/0202501 | A1 * | 8/2013 | Saudray .................. C22B 3/065 423/10 |
| 2016/0314861 | A1 | 10/2016 | Bernier et al. |

FOREIGN PATENT DOCUMENTS

| FR | 2 591 213 A1 | 6/1987 |
| FR | 2 642 561 A1 | 8/1990 |
| FR | 2 642 562 A1 | 8/1990 |
| FR | 2 960 690 A1 | 12/2011 |

OTHER PUBLICATIONS

International Search Report for PCT/EP2016/068040 dated Oct. 10, 2016.
Preliminary French Search Report for French Application No. FR 15 57263 dated May 3, 2016.
U.S Appl. No. 15/748,030 entitled "Novel Dissymmetric N,N-Dialkylamides, The Synthesis Thereof and Uses of Same" filed Jan. 26, 2018.
English Translation of the Written Opinion of the International Search Authority for PCT/EP2016/068040.

* cited by examiner

*Primary Examiner* — Steven J Bos
(74) *Attorney, Agent, or Firm* — Pearne & Gordon LLP

(57) ABSTRACT

A method for the treatment of an aqueous solution resulting from the dissolution of a spent nuclear fuel in nitric acid, allowing the uranium and plutonium contained in the solution to be extracted, separated and decontaminated in a single cycle, without requiring any operation involving a reductive stripping of plutonium. Applications for the method include the processing of uranium-based and/or plutonium-based spent nuclear fuels.

15 Claims, 3 Drawing Sheets

METHOD FOR THE TREATMENT OF AN AQUEOUS NITRIC SOLUTION RESULTING FROM DISSOLVING SPENT NUCLEAR FUEL, SAID METHOD BEING PERFORMED IN A SINGLE CYCLE AND WITHOUT REQUIRING ANY OPERATION INVOLVING REDUCTIVE STRIPPING OF PLUTONIUM

This is a National Stage application of PCT international application PCT/EP2016/068040, filed on Jul. 28, 2016 which claims the priority of French Patent Application No. 15 57263, filed Jul. 29, 2015, both of which are incorporated herein by reference in their entirety.

TECHNICAL FIELD

The invention relates to a method for processing an aqueous solution resulting from the dissolution of a spent nuclear fuel in nitric acid, allowing the uranium and plutonium contained in this solution to be extracted, separated and decontaminated in a single cycle and without having recourse to a reductive stripping operation of plutonium.

This method finds application in the processing of spent nuclear fuels containing uranium, notably of oxides of uranium—UOX, or oxides of uranium and plutonium, in particular mixed oxides of uranium and plutonium—MOX.

STATE OF THE PRIOR ART

The PUREX process, that is implemented in all spent nuclear fuel processing plants existing throughout the world (La Hague in France, Rokkasho in Japan, Sellafield in the United Kingdom, etc), uses tri-n-butyl phosphate (or TBP) as extractant to recover uranium and plutonium via liquid-liquid extraction from aqueous solutions resulting from the dissolution of these fuels in nitric acid.

In this process, TBP is used in 30% (v/v) solution in an organic diluent (hydrogenated tetrapropylene (or TPH) or n-dodecane). This organic solution is commonly called a «solvent» in the field under consideration.

The recovery of uranium and plutonium with the PUREX process is conducted in several cycles:

- a first purification cycle of uranium and plutonium (called «1CUPu»), intended to decontaminate the uranium and plutonium with respect to americium, curium and fission products, with a partitioning of uranium and plutonium into two aqueous streams in this first cycle via a reductive stripping of plutonium;
- a second purification cycle of uranium (called «2CU»), intended to complete uranium decontamination to reach the specifications laid down by ASTM standards for the end uranium product; and
- a second and, in some plants, a third purification cycle of plutonium (respectively called «2CPu» and «3CPu»), intended to complete plutonium decontamination to reach the specifications laid down by ASTM standards for the end plutonium product and for concentration thereof before conversion to oxide.

The performance levels of the PUREX process are satisfactory and the feedback of experience acquired since the start-up of plants using this process is positive.

However, the use of TBP has limits impeding the possibility with this extractant of reaching the objectives of simplicity, compactness and improved safety that have been set for future spent nuclear fuel processing plants which particularly target the elimination of cycles 2CU, 2CPu and 3CPu from the PUREX process.

These limits are the following:

- the decontamination factors of uranium and plutonium with respect to some fission products (technetium and ruthenium) and transuranium elements (Np) are insufficient at the end of the first purification cycle, hence the impossibility of achieving with TBP a scheme which would lead to end products meeting the aforementioned specifications in a single cycle;
- the partitioning of uranium and plutonium into two aqueous streams requires the reducing of plutonium(IV) to plutonium(III) (since with TBP, the separation factor between uranium(VI) and plutonium(IV) is insufficient, irrespective of the acidity of the aqueous solution used to obtain such a separation), and as a result requires the use of high amounts of reducing and anti-nitrous agents which generate unstable and reactive species via degradation that are therefore restricting in terms of safety;
- TBP degradation products have an impact on the performance levels of the process; in particular, di-n-butyl phosphate (or DBP) leads to the formation of metal complexes of which some are insoluble and may cause retaining of plutonium in the solvent, hence the need to carry out an operation known as «Pu barrier», which is downstream of the plutonium reductive stripping and which is intended to complete this stripping;
- the risk of formation of a $3^{rd}$ phase induced by the presence of plutonium limits the implementation of a plutonium concentrating scheme (for risks of criticality) or of a scheme allowing the processing of spent nuclear fuels with high plutonium content such as MOX fuels issued from light water reactors or fast neutron reactors;
- the stripping of uranium from the solvent in which it was previously extracted is incomplete if conducted at ambient temperature, hence the need to perform this stripping at a temperature of 50° C. (which corresponds to the maximum temperature allowed by the flash point of the solvent); however, even at this temperature, the stripping of uranium is diluting (the organic/aqueous flow ratio (O/A) being lower than 1);
- the solubility of TBP, that is non-negligible in an aqueous phase (up to 300 mg/L depending on the acidity of the aqueous phase) necessitates washes with organic diluent of the aqueous phases resulting from the difference extraction cycles to recover the TBP solubilised in these aqueous phases; and
- the incineration of the spent TBP and the degradation products thereof generates secondary wastes including solid phosphate residues.

Therefore, with the prospect of future spent nuclear fuel processing plants that are simpler and more compact than current plants and having further an improved safety, the Inventors have set out to develop a method which, whilst performing as well as the PUREX process in terms of the recovery and decontamination of uranium and plutonium contained in aqueous nitric solutions resulting from the dissolution of spent nuclear fuels, allows overcoming all the limits related to the use of TBP as extractant, and which in particular only comprises a single processing cycle and is free of any operation for reductive plutonium stripping.

SUMMARY OF THE INVENTION

This objective is reached with the invention which proposes a method for processing, in one cycle, an aqueous solution resulting from the dissolution of a spent nuclear fuel in nitric acid, the aqueous solution comprising uranium, plutonium americium, curium and fission products including technetium, the cycle comprising:

a) a co-extraction of uranium and plutonium from the aqueous solution, this co-extraction comprising at least one contacting, in an extractor, of the aqueous solution with an organic solution comprising from 1 mol/L to 2 mol/L of N,N-di(2-ethylhexyl)-3,3-dimethylbutanamide or a mixture of N,N-di(2-ethylhexyl)-isobutanamide and N,N-di(2-ethylhexyl)-n-butanamide as extractant, in solution in an organic diluent, followed by a separation of the aqueous and organic solutions;

b) a decontamination of the organic solution resulting from step a) with respect to americium, curium and fission products, this decontamination comprising at least one contacting, in an extractor, of the organic solution with an aqueous solution comprising from 0.5 mol/L to 6 mol/L of nitric acid, followed by a separation of the organic and aqueous solutions;

c) a partitioning of the uranium and plutonium contained in the organic solution resulting from step b) into an aqueous solution and an organic solution, the aqueous solution comprising either plutonium without uranium, or a mixture of plutonium and uranium, and the organic solution comprising uranium without plutonium, this partitioning comprising:

$c_1$) a stripping of plutonium, in oxidation state +IV, and of a fraction of uranium from the organic solution resulting from step b), this stripping comprising at least one contacting, in an extractor, of the organic solution with an aqueous solution comprising from 0.1 mol/L to 0.5 mol/L of nitric acid, followed by a separation of the organic and aqueous solutions;

$c_2$) an extraction of all or part of the uranium fraction contained in the aqueous solution resulting from step $c_1$), this extraction comprising at least one contacting, in an extractor, of the aqueous solution resulting from step $c_1$) with an organic solution identical to the organic solution used at step a), followed by a separation of the aqueous and organic solutions;

d) a decontamination of the organic solution resulting from step $c_1$) with respect to technetium, the decontamination comprising:

$d_1$) a stripping of technetium, in oxidation state +IV, from the organic solution resulting from step $c_1$), this stripping comprising at least one contacting, in an extractor, of the organic solution with an aqueous solution comprising from 0.1 mol/L to 3 mol/L of nitric acid and at least one reducing agent capable of reducing technetium from oxidation state +VII to oxidation state +IV, or a complexing agent capable of stabilising technetium in aqueous phase, followed by a separation of the organic and aqueous solutions;

$d_2$) an extraction of the uranium fraction contained in the aqueous solution resulting from step $d_1$), this extraction comprising at least one contacting, in an extractor, of the aqueous solution with an organic solution identical to the organic solution used at step a), followed by a separation of the aqueous and organic solutions;

e) a stripping of uranium from the organic solution resulting from step $d_1$), this stripping comprising at least one contacting, in an extractor, of the organic solution resulting from step $d_1$) with an aqueous solution comprising no more than 0.05 mol/L of nitric acid, followed by a separation of the organic and aqueous solutions; and f) a regeneration of the organic phase resulting from step e); whereby a first and second aqueous solution are obtained, decontaminated with respect to americium, curium and fission products including technetium, the first aqueous solution comprising plutonium without uranium or a mixture of plutonium and uranium, and the second aqueous solution comprising uranium without plutonium.

Therefore, the method of the invention is based on the use, as extractant, of a particular N,N-dialkylamide or of a mixture of two particular N,N-dialkylamides, these particular N,N-dialkylamides being selected from among:

N,N-di(2-ethylhexyl)-3,3-dimethylbutanamide (or DEHDMBA) of formula: $(CH_3)_3-C-CH_2-C(O)-N-(CH_2-CH(C_2H_5)C_4H_9)_2$;

N,N-di(2-ethylhexyl)-isobutanamide (or DEHiBA) of formula: $(CH_3)_2-CH-C(O)-N-(CH_2-CH(C_2H_5)C_4H_9)_2$; and N,N-di(2-ethylhexyl)-n-butanamide (or DEHBA) of formula: $C_3H_7-C(O)-N-(CH_2-CH(C_2H_5)C_4H_9)_2$.

It is to be noted that N,N-dialkylamides (also called «monoamides») represent a family of extractants that has been largely researched as a possible alternative to TBP for the processing of spent nuclear fuels. First developed in the USA in the 1950s, this family of extractants later became the subject of research of various European, Indian, Japanese and Chinese researchers in the 1980's. Three French applications (FR-A-2 591 213, FR-A-2 642 561 and FR-A-2 642 562, hereafter references [1], [2] and [3]) relating to the use of N,N-dialkylamides as extractants for the processing of spent nuclear fuels were filed in the 1980's of which one, namely reference [1], envisages the possible partitioning of uranium and plutonium without performing reductive stripping of plutonium using N,N-dialkylamides branched on their carbonyl function side.

However, to the knowledge of the Inventors, it has never been reported in the literature that the use as extractants of aptly chosen N,N-dialkylamides could allow the development of a method for processing spent nuclear fuels which, whilst only comprising a single cycle and being free of any operation for reductive stripping of plutonium, performs as well as the PUREX process in terms of the recovery and decontamination of uranium and plutonium contained in aqueous nitric solutions resulting from the dissolution of these fuels. A fortiori said method has never been proposed in the literature.

In the foregoing and in the remainder hereof, the terms «aqueous solution» and «aqueous phase» are equivalent and interchangeable, and similarly the terms «organic solution» and «organic phase» are equivalent and interchangeable.

Also, the expressions «from . . . to . . . », «ranging from . . . to . . . » and «of between . . . and . . . » are equivalent and are meant to indicate that the limits are included.

According to the invention, the organic solution used at step a) and hence those used at steps $c_2$) and $d_2$) since the organic solutions used at steps a), $c_2$) and $d_2$) have the same composition, preferably comprise from 1.3 mol/L to 1.4 mol/L and better still 1.35 mol/L of DEHDMBA, or else from 1.35 mol/L to 1.45 mol/L and better still 1.4 mol/L of the mixture of DEHiBA and DEHBA, in which case the DEHiBA/DEHBA molar ratio is advantageously from 1.75 to 1.85 and better still of 1.80.

In particularly preferred manner, the organic solution used at step a) and hence those used at steps $c_2$) et $d_2$), comprise 0.9 mol/L of DEHiBA and 0.5 mol/L of DEHBA.

As previously indicated, the aqueous solution used at step b) may comprise from 0.5 mol/L to 6 mol/L of nitric acid.

However, it is preferred that this aqueous solution should comprise from 4 mol/L to 6 mol/L of nitric acid to facilitate stripping of ruthenium and technetium from the organic solution resulting from step a). In this case, step b) advantageously also comprises a deacidification of the organic solution, this deacidification comprising at least one contacting of the organic solution with an aqueous solution comprising from 0.1 mol/L to 1 mol/L and better still 0.5 mol/L of nitric acid, followed by a separation of the organic and aqueous solutions.

According to the invention, the contacting of the organic and aqueous solutions in the extractor in which step $c_1$) takes place, comprises a circulation of these solutions in an O/A flow ratio that is advantageously higher than 1, preferably 3 or higher and better still 5 or higher, so as to obtain a concentrating stripping of plutonium, i.e. a plutonium stripping which leads to an aqueous solution in which the concentration of plutonium is greater than the concentration of this element in the organic solution from which it is stripped.

The reducing agent(s) in the aqueous solution used at step $d_1$) is (are) preferably selected from among uranous nitrate (also called «U(IV)»), hydrazinium nitrate (also called «hydrazine nitrate»), hydroxylammonium nitrate (also called «hydroxylamine nitrate»), acetaldoxime and mixtures thereof such as a mixture of uranous nitrate and hydrazinium nitrate, a mixture of uranous nitrate and hydroxylammonium nitrate or a mixture of uranous nitrate and acetaldoxime, preference being given to a mixture of uranous nitrate and hydrazinium nitrate or a mixture of uranous nitrate and hydroxylammonium nitrate that are preferably used in a concentration ranging from 0.1 mol/L to 0.3 mol/L and typically of 0.2 mol/L.

In addition, step $d_1$), that can be conducted at ambient temperature, is preferably conducted however at a temperature ranging from 30 to 40° C. and better still at 32° C. to promote the stripping kinetics of technetium whilst best limiting phenomena of re-oxidization of this element in aqueous phase. The extractor in which step $d_1$) takes place is therefore preferably heated to a temperature of between 30° C. and 40° C.

According to the invention, preferably step $d_2$) additionally comprises an acidification of the aqueous solution resulting from step $d_1$), this acidification comprising the addition of nitric acid to the extractor in which step $d_2$) is conducted to bring the concentration of nitric acid in the aqueous solution to a value of at least 2.5 mol/L.

Step e) can be conducted at ambient temperature. However, it is preferably conducted at a temperature ranging from 40° C. to 50° C. here also to promote the stripping of uranium. The extractor in which step e) takes place is therefore preferably heated to a temperature of between 40° C. and 50° C.

Irrespective of the temperature at which step e) is conducted, the contacting of the organic and aqueous solutions in the extractor in which this step takes place comprises a circulation of these solutions with an O/A flow ratio higher than 1 so as to obtain a concentrating stripping of uranium, i.e. an uranium stripping leading to an aqueous solution in which the concentration of uranium is higher than the concentration of this element in the organic solution from which it is stripped.

As previously indicated, the method of the invention further comprises a step f) to regenerate the organic solution resulting from step e), this regeneration preferably comprising at least one washing of the organic solution with a basic aqueous solution, followed by at least one washing of the organic solution with an aqueous solution of nitric acid.

Advantageously, the organic solution resulting from step f) is divided into a first and second fraction, the first fraction forming the organic solution of step a) and the second fraction forming the organic solution of step $c_2$).

The method of the invention, in addition to those already mentioned, has the following advantages:

the uranium stripping is easier to implement than with the PUREX process since it can be performed both at ambient temperature and under heat using an O/A flow ratio higher than 1, thereby allowing a concentrating stripping of uranium which is not possible with the PUREX process;

through the fact that it does not involve any plutonium reduction reaction and thereby eliminates any risk of plutonium re-oxidization, the plutonium stripping is also easier to implement than with the PUREX process and can be performed in more concentrating manner than in this latter process; the importance of these advantages is all the greater since future spent nuclear fuel processing plants will have to process fuels with a higher plutonium content (such as MOX fuels from light water or fast neutron reactors) than the fuels currently being reprocessed;

the degradation products (via hydrolysis and radiolysis) of the N,N-dialkylamides are less problematic than those of TBP because they are water-soluble and do not form complexes likely to retain plutonium;

the N,N-dialkylamides typically have solubility in an aqueous phase 100 to 200 times lower than that of TBP and it can thus be envisaged to supress or at least reduce the number of washes in organic diluent of the aqueous solutions resulting from the method of the invention, compared with the number provided in the PUREX process;

since the N,N-dialkylamides and the degradation products thereof only comprise carbon, hydrogen, oxygen and nitrogen atoms, they are fully incinerable and therefore do not produce penalising secondary wastes, contrary to TBP and its degradation products.

Other characteristics and advantages of the invention will become apparent from the following additional description referring to the appended Figures.

However, this additional description is only given to illustrate the subject-matter of the invention and is not under any circumstances to be construed as limiting this subject-matter.

BRIEF DESCRIPTION OF THE FIGURES

In FIGS. 1 to 3, the organic phases are symbolised by solid lines whilst the aqueous phases are symbolised by dotted lines.

DETAILED DESCRIPTION OF PARTICULAR EMBODIMENTS

I—Flow Diagram of the Method of the Invention

Figure 1:
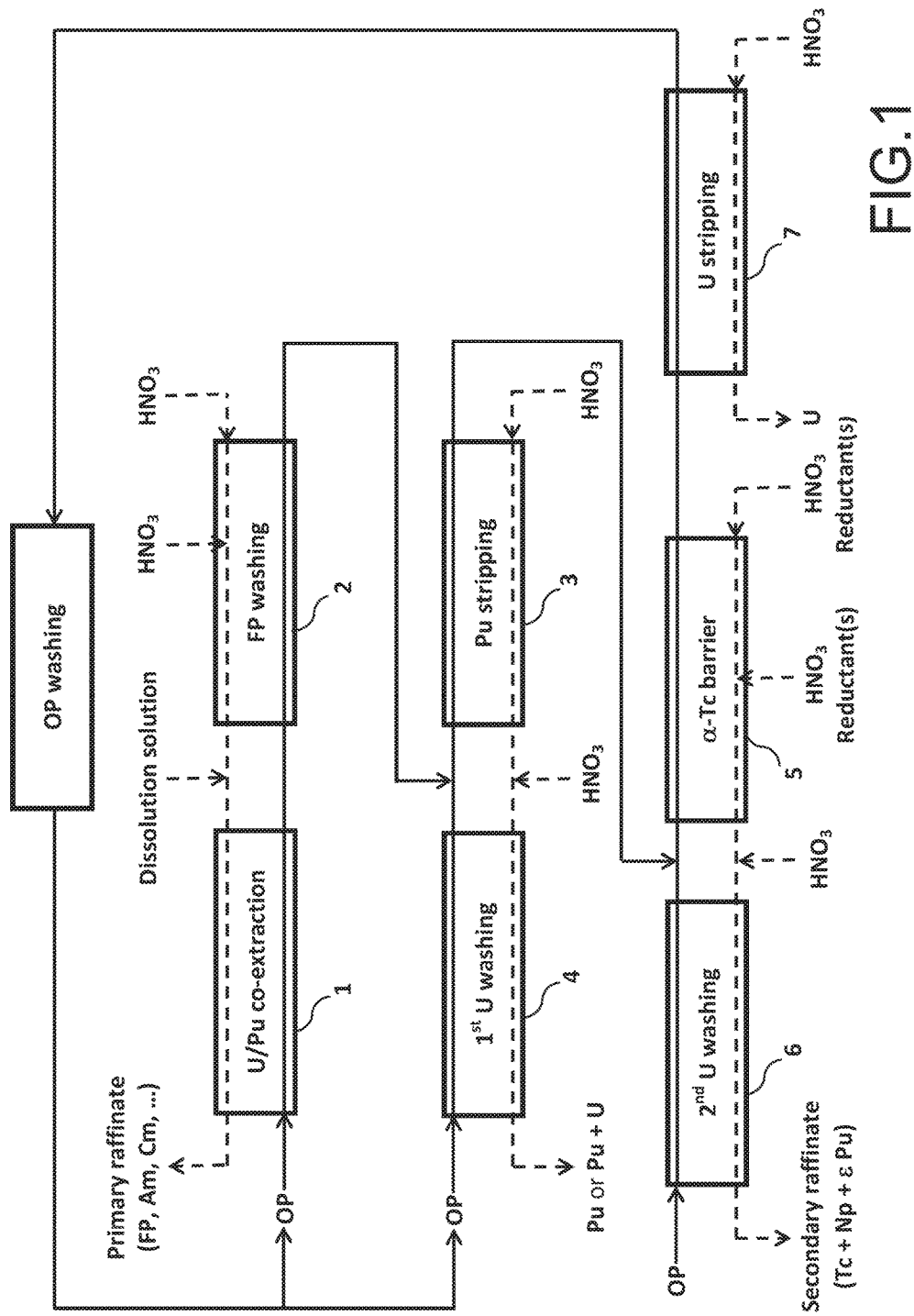
FIG. 1 gives a flow diagram of the method of the invention; in this Figure, rectangles 1 to 7 represent multi-stage extractors such as those conventionally used for the processing of spent nuclear fuels (mixer-settlers, pulsed columns or centrifugal extractors).

Reference is first made to FIG. 1 giving a flow diagram of the method of the invention.

As shown in this Figure, the method comprises 8 steps.

The first of these steps, denoted «U/Pu co-extraction» in FIG. 1, is intended to obtain the joint extraction of uranium and plutonium, the first in oxidation state +VI and the second in oxidation state +IV, from an aqueous solution resulting from the dissolution of spent nuclear fuels in nitric acid.

Such a solution typically comprises from 3 to 6 mol/L of $HNO_3$, uranium, plutonium, minor actinides (americium, curium and neptunium), fission products (La, Ce, Pr, Nd, Sm, Eu, Gd, Mo, Zr, Ru, Tc, Rh, Pd, Y, Cs, Ba, . . . ) and a few corrosion products such as iron.

The «U/Pu co-extraction step» is performed by circulating the dissolution solution in extractor 1, in counter-current flow to an organic phase (denoted «OP» in FIG. 1) which comprises:
- either DEHDMBA in solution in an organic diluent, in which case the concentration of this monoamide in the organic phase is from 1 mol/L to 2 mol/L, preferably from 1.3 mol/L to 1.4 mol/L and better still 1.35 mol/L;
- or a mixture of DEHiBA and DEHBA in solution in an organic diluent, in which case the concentration of this mixture (which therefore corresponds to the total concentration of monoamides) in the organic phase is from 1 mol/L to 2 mol/L, preferably from 1.3 mol/L to 1.5 mol/L and better still 1.4 mol/L, with a DEHiBA/DEHBA molar ratio that is preferably from 1.7 to 1.9 and better still 1.80; this gives for example 0.9 mol/L of DEHiBA per 0.5 mol/L of DEHBA when the concentration of the mixture is 1.4 mol/L.

The organic diluent is an aliphatic, straight-chain or branched hydrocarbon, such as n-dodecane, TPH, the isoparaffinic diluent marketed by TOTAL under the trade name Isane IP 185T, preference being given to TPH.

The second step of the method denoted «FP washing» in FIG. 1, is intended to strip from the organic phase resulting from «U/Pu co-extraction» the fraction of fission products that was extracted from the dissolution solution jointly with the uranium and plutonium.

For this purpose, the «FP washing» step comprises one or more washing operations of the organic phase resulting from «U/Pu co-extraction», each washing operation being performed by circulating this organic phase in extractor 2, in counter-current flow to an aqueous nitric solution having a concentration possibly ranging from 0.5 mol/L to 6 mol/L of $HNO_3$, but preferably from 4 mol/L to 6 mol/L of $HNO_3$ and better still from 4 to 5 mol/L of $HNO_3$ so as to facilitate the stripping of ruthenium and technetium.

Figure 2:
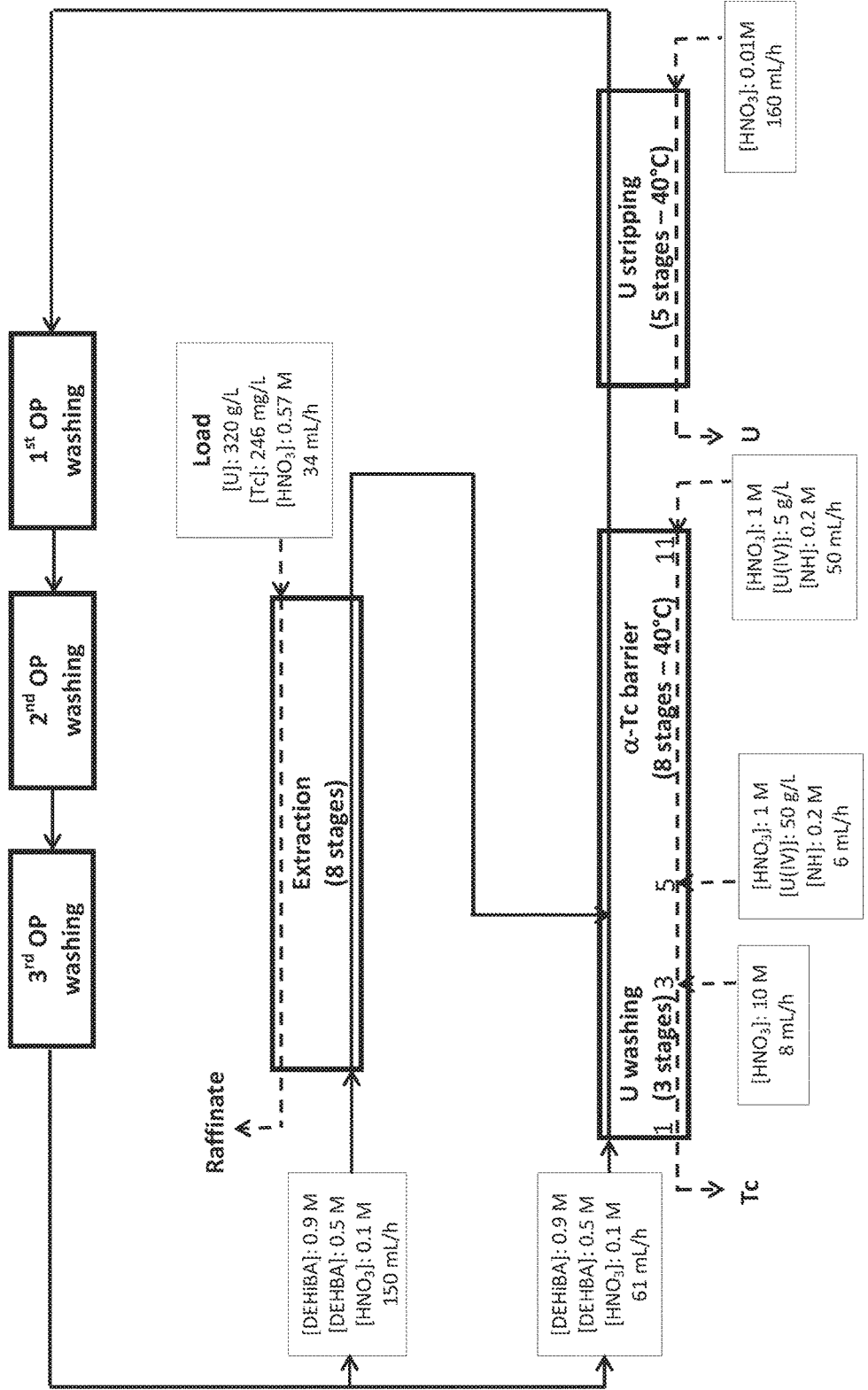
FIG. 2 schematically illustrates the installation and operating conditions used for a test intended to validate the «α-Tc barrier» step of the method of the invention in an extractor.

If the «FP washing» step is conducted with one or more aqueous solutions of strong acidity, i.e. typically of 3 mol/L of $HNO_3$ or higher, then this step further comprises a deacidification of the organic phase that is performed by circulating this organic phase in counter-current flow to a weakly acidic aqueous nitric solution, i.e. comprising from 0.1 to 1 mol/L of $HNO_3$ such as, for example, an aqueous solution comprising 0.5 mol/L of $HNO_3$, to prevent a too important amount of acid to be carried away towards the extractor dedicated to the third step denoted «Pu stripping» in FIG. 2, that would perturb the performance of this third step.

The «Pu stripping» step, which represents the first step of the U/Pu partitioning, is intended to strip the plutonium in oxidation state +IV, and therefore, without reducing this plutonium, from the organic phase resulting from «FP washing». This step is performed by circulating this organic phase in extractor 3 in counter-current flow to an aqueous solution comprising from 0.1 mol/L to 0.5 mol/L of $HNO_3$ and by preferably using an O/A flow ratio higher than 1, preferably of 3 or higher and better still of 5 or higher, so that plutonium(IV) is stripped in a concentrating manner.

The stripping of plutonium(IV), performed at the «Pu stripping» step, is accompanied by a stripping of a fraction of the uranium(VI) that is also contained in the organic phase resulting from «FP washing».

The fourth step of the method, denoted «$1^{st}$ U washing» in FIG. 1 and representing the second U/Pu partitioning step, is therefore intended to extract from the aqueous phase resulting from «Pu stripping»:
- either the entirety of the uranium contained in this aqueous phase if it is desired that the U/Pu partitioning should lead to an aqueous solution comprising plutonium without uranium, and to an organic solution comprising uranium without plutonium;
- or the quantity of uranium which, after «$1^{st}$ U washing», allows an aqueous solution to be obtained comprising uranium and plutonium in a previously chosen ratio, if it is desired that the U/Pu partitioning should lead to an aqueous solution comprising a mixture of plutonium and uranium in this ratio, and to an organic solution comprising uranium without plutonium.

In both cases, «$1^{st}$ U washing» is performed by circulating the aqueous phase resulting from «Pu stripping» in extractor 4, in counter-current flow to an organic phase having an identical composition to that of the organic phase used at «U/Pu co-extraction». The quantity of extracted uranium is adjusted first by acting on the O/A flow ratio and secondly on the acidity of the aqueous phase, the extraction of uranium being all the greater the higher the organic phase/aqueous phase flow ratio and the stronger the acidity of the aqueous phase. An addition of $HNO_3$ of greater or lesser concentration to the aqueous phase circulating in extractor 4 can therefore be provided depending on the acidity that it is desired to impart to this aqueous phase.

The fifth step denoted «α-Tc barrier» in FIG. 1 is intended to strip, from the organic phase resulting from «Pu stripping», that fraction of technetium that was extracted at «U/Pu co-extraction» but that was not stripped at «FP washing», for the purpose of decontaminating this organic phase with respect to technetium.

It also allows the stripping, from the organic phase resulting from «Pu stripping», of the fraction of neptunium that was extracted at «U/Pu co-extraction» and which followed technetium up to «α-Tc barrier», as well as traces of plutonium that this organic phase may still contain.

This step is performed by circulating the organic phase resulting from «Pu stripping» in extractor 5, in counter-current flow to an aqueous nitric solution of low acidity, i.e. comprising from 0.1 mol/L to 3 mol/L of $HNO_3$ and better still 1 mol/L of $HNO_3$, and comprising one or more reducing agents allowing the reduction of technetium—which is present in the organic phase in oxidation state +VII—to technetium(IV) non-extractable by the N,N-dialkylamides, of neptunium(VI) to neptunium(IV) or neptunium(V) non-extractable by N,N-dialkylamides at low acidity, and of plutonium(IV) to plutonium(III) that is less extractable by N,N-dialkylamides at low acidity than plutonium(IV), without reducing uranium(VI).

As reducing agents, uranous nitrate (or U(IV)), hydrazinium nitrate (or HN), hydroxylammonium nitrate (or HAN), acetaldoxime, or a mixture thereof such as a mixture U(IV)/HN, U(IV)/HAN or U(IV)/acetaldoxime, can be used, preference being given to a mixture U(IV)/HN or U(VI)/HAN. Gluconic acid can be added to the aqueous solution to reduce phenomena of technetium re-oxidization in the aqueous phase and thereby limit consumption of reducing agent(s).

This step can be conducted at ambient temperature (i.e. 20-25° C.) but preferably it is conducted at a temperature ranging from 30° C. to 40° C. and better still at 32° C. to promote the stripping kinetics of technetium whilst limiting technetium re-oxidization phenomena in the aqueous phase, and hence limit the risk of the technetium, once stripped, of being back-extracted into the organic phase.

The sixth step, denoted «$2^{nd}$ U washing» in FIG. 1 is intended to extract, from the aqueous phase resulting from «α-Tc barrier», the uranium that was stripped together with the technetium at the preceding step, so as to avoid the «α-Tc barrier» step leading to a too high loss of uranium in aqueous phase.

It is performed by circulating the aqueous phase resulting from «α-Tc barrier» in extractor 6, in counter-current flow to an organic phase having an identical composition to that of the organic phases used for «U/Pu co-extraction» and «1St U washing», after acidification of this aqueous phase through the addition of concentrated nitric acid, e.g. 10 M, to promote the extraction of uranium. The seventh step, denoted «U stripping» in FIG. 1, is intended to strip uranium (VI) from the organic phase resulting from «α-Tc barrier».

It is performed by circulating the organic phase resulting from «α-Tc barrier» in extractor 7, in counter-current flow to an aqueous nitric solution of low acidity, i.e. comprising no more than 0.05 mol/L of $HNO_3$ such as for example an aqueous solution comprising 0.01 mol/L of $HNO_3$. This step can be performed at ambient temperature (i.e. 20-25° C.) but it is preferably conducted under heat (i.e. typically at a temperature of 40-50° C.) using an O/A flow ratio higher than 1 so that the uranium(VI) is stripped in concentrating manner.

After these 7 steps, we obtain:
- two raffinates, corresponding to the aqueous phases respectively leaving extractors 1 and 6, the first comprising fission products and americium and curium («Primary raffinate» in FIG. 1), and the second comprising technetium, neptunium and possibly traces of plutonium («Secondary raffinate» in FIG. 1);
- the aqueous phase leaving extractor 4 comprises either decontaminated plutonium or a mixture of decontaminated plutonium and decontaminated uranium, called «Pu stream» or «Pu+U stream» accordingly;
- the aqueous phase leaving extractor 7 comprising decontaminated uranium, called «U stream»; and
- the organic phase leaving extractor 7 which no longer comprises any plutonium or uranium but may contain a certain number of impurities and degradation products (formed by hydrolysis and radiolysis) of the extractant which may have accumulated over the preceding steps.

Therefore, the eighth step, denoted «OP washing» in FIG. 1, is intended to regenerate this organic phase by subjecting it to one or more washes with a basic aqueous solution, for example a first wash with an aqueous solution of 0.3 mol/L of sodium carbonate, followed by a second wash with an aqueous solution of 0.1 mol/L of sodium hydroxide, then one or more washes with an aqueous nitric acid solution allowing re-acidification of the organic phase, for example an aqueous solution comprising 2 mol/L of $HNO_3$, each wash being performed by circulating said organic phase in an extractor in counter-current flow to the aqueous washing solution.

As can be seen in FIG. 1, the organic phase thus regenerated can be recycled back to extractors 1 and 4 to be re-introduced in the processing cycle.

II—Experimental Validation

II.1—Acquisition, in Test Tubes, of the Distribution Coefficients of Uranium, Plutonium and Fission Products, in Aqueous Solutions Resulting from Dissolution of Spent Nuclear Fuel Pellets in $HNO_3$ First series of tests: comparison between monoamides and TBP:

Extractions were performed in test tubes, using:
- as organic phases: phases comprising either a DEHiBA/DEHBA mixture comprising 1.2 mol/L DEHiBA and 0.3 mol/L DEHBA in TPH, or 1.1 mol/L DEHDMBA in TPH, or 30% (v/v) TBP in TPH; and
- as aqueous phases: aliquots of an aqueous solution previously obtained by dissolving pellets of irradiated MOX fuel in nitric acid.

This aqueous solution comprised 3.15 mol/L of $HNO_3$ and the constituent elements of its composition are given in Table 1 below.

TABLE I

| Element | Concentration (g/L) | Activity (GBq/L) |
| --- | --- | --- |
| U(VI) | 260 | — |
| Pu(IV) | 10.4 | — |
| $^{106}$Ru | — | 690 |
| $^{144}$Ce | — | 932 |
| $^{154}$Eu | — | 89 |
| $^{137}$Cs | — | 1247 |
| $^{241}$Am | — | 44 |

Each organic phase was placed in contact, under agitation, with an aliquot of aqueous solution for 30 minutes at 25° C. The O/A volume ratio used was 4. These phases were then separated from one another after centrifugation.

The concentrations of uranium and plutonium and the activities of americium and fission products were measured in the organic and aqueous phases thus separated, by colorimetry for uranium, α-spectrometry for plutonium and γ-spectrometry for americium and fission products.

Table II below gives the distribution coefficients such as determined from the concentrations and activities thus measured.

TABLE II

| Organic phase | Distribution coefficients | | | | | | |
|---|---|---|---|---|---|---|---|
| | U(VI) | Pu(IV) | $^{106}$Ru | $^{144}$Ce | $^{154}$Eu | $^{137}$Cs | $^{241}$Am |
| DEHDMBA 1.1M/TPH | 2.4 | 0.47 | $3 \times 10^{-4}$ | $<2 \times 10^{-6}$ | $<2 \times 10^{-5}$ | $<3 \times 10^{-6}$ | $4 \times 10^{-6}$ |
| (DEHiBA 1.2M + DEHBA 0.3 M)/TPH | 3.0 | 0.35 | $6.9 \times 10^{-4}$ | $<2 \times 10^{-6}$ | $<2 \times 10^{-5}$ | $<3 \times 10^{-6}$ | $3 \times 10^{-6}$ |
| 30% TBP/TPH | 20 | 6.4 | $2 \times 10^{-3}$ | $10^{-3}$ | $6 \times 10^{-3}$ | $<3 \times 10^{-6}$ | $3 \times 10^{-3}$ |

These results show that under the concentrations used, uranium(VI) and plutonium(IV) are less well extracted by the organic phases comprising either the DEHiBA/DEHBA mixture or DEHDMBA in TPH, than by an organic phase composed of TBP in TPH. However, they also show that the fission products and trivalent actinides such as americium are also less well extracted by the monoamide-based organic phases, which makes possible to obtain very efficient decontamination of uranium and plutonium with respect to these fission products and trivalent actinides via the «FP washing» step of the method of the invention.

Second Series of Tests with the DEHiBA/DEHBA Mixture as Extractant:

Tests intended to simulate, in tubes, the implementation in extractors of the steps «U/Pu co-extraction», «$1^{st}$ FP washing», «Pu stripping» (two stages), «α-Tc barrier», and «U stripping» of the method of the invention were conducted using an aqueous solution previously obtained by dissolving pellets, in nitric acid, of different irradiated fuels of UOX-BWR type (Boiling water reactor) and UOX-REP type (Pressurised water reactor).

This aqueous solution comprised 4.3 mol/L of $HNO_3$ and the constituent elements of its composition are given in Table III below.

TABLEAU III

| Element | Concentration (g/L) | Element | Concentration (g/L) | Element | Activity (Bq/L) |
|---|---|---|---|---|---|
| U | 244 | Si | 0.175 | $^{106}$Ru | $1.1 \times 10^{11}$ |
| Pu | 2.53 | Ba | 0.570 | $^{134}$Cs | $2.4 \times 10^{11}$ |
| Tc | 0.275 | Al | 0.145 | $^{137}$Cs | $1.1 \times 10^{12}$ |
| Np | 0.214 | Ca | 0.130 | $^{144}$Ce | $9.7 \times 10^{10}$ |
| Zr | 1.08 | K | 0.070 | $^{154}$Eu | $3.6 \times 10^{10}$ |
| Ru | 0.510 | Mg | 0.090 | $^{155}$Eu | $2.2 \times 10^{10}$ |
| Mo | 0.106 | Na | 0.135 | $^{241}$Am | $6.6 \times 10^{10}$ |
| Pd | 0.345 | Sr | 0.210 | | |
| Fe | 0.285 | | | | |

The tests were conducted as follows:

«U/Pu co-extraction» step: the aqueous solution was placed in contact, under agitation, with an organic phase comprising 0.9 mol/L of DEHiBA and 0.5 mol/L of DEHBA in TPH, previously equilibrated at 6 mol/L of $HNO_3$, for 15 minutes at 25° C., with an O/A volume ratio of 2.5. The aqueous and organic phases were then separated after centrifugation.

The concentrations of uranium and plutonium, and the activities of americium and β-γ isotopes were measured in each of the organic and aqueous phases thus separated, by X-ray fluorescence for uranium and plutonium, and by γ-spectrometry for the β-γ isotopes.

The concentrations of Tc, Np, Zr, Mo and Fe were only able to be measured in the aqueous phase by ICP-AES, and the concentrations of these elements in the organic phase were estimated by the difference between the initial concentrations of said elements in the aqueous phase and those measured at equilibrium after extraction.

«FP washing» step: the organic phase obtained after the «U/Pu co-extraction step» was contacted, under agitation, with an aqueous solution comprising 2 mol/L of $HNO_3$ for 15 minutes at 25° C., with an O/A volume ratio of 2. The aqueous and organic phases were then separated after centrifugation and analysed as previously.

«Pu stripping» step: the organic phase obtained after the «FP washing» step was contacted, under agitation, 2 successive times (with a renewal of the aqueous phase) with an aqueous solution comprising 0.1 mol/L of $HNO_3$ and 140 g/L of uranium (this allowing the uranium to remain held in the organic phase and prevents transfer thereof to the aqueous phase) for 15 minutes at 25° C., with an O/A volume ratio of 2. The aqueous and organic phases were then separated after centrifugation and analysed as previously.

«α-Tc barrier» step: the organic phase obtained after the «Pu stripping» step was placed in contact, under agitation, with an aqueous solution comprising 1.5 mol/L of $HNO_3$, 5 g/L of uranium(IV) and 0.2 mol/L of hydroxylammonium nitrate (HAN), for 30 minutes at 25° C., with an O/A volume ratio of 1.5. The aqueous and organic phases were then separated after centrifugation and analysed as previously.

«U stripping» step: the organic phase obtained after the «α-Tc barrier» step was contacted, under agitation, with an aqueous solution comprising 0.01 mol/L of $HNO_3$ for 15 minutes at 45° C., with an O/A volume ratio of 0.5. The aqueous and organic phases were separated after centrifugation and analysed as previously.

All the operating conditions used for each step are summarised in Table IV below, whilst the results obtained after each contacting, in terms of aqueous phase acidity denoted $[H^+]_{aq}$, concentration of uranium in the organic phase denoted $[U]_{org}$, and distribution coefficients denoted D, are given in Table V below.

TABLE IV

| Contact | Organic phase | Aqueous phase | $V_O/V_A$ | $\theta$ (° C.) | Agitation time (min) |
|---|---|---|---|---|---|
| 1 «U/Pu co-extraction» | Pre-equilibrated in acid | [HNO$_3$]: 4.3M | 2.5 | 25° C. | 15 |
| 2 «FP washing» | From 1 | [HNO$_3$]: 2M | 2 | 25° C. | 15 |
| 3 «Pu stripping» 1$^{st}$ contact | From 2 | [U(VI)]: 140 g/L [HNO$_3$]: 0.1M | 2 | 25° C. | 15 |
| 4 «Pu stripping» 2$^{nd}$ contact | From 3 | [U(VI)]: 140 g/L [HNO$_3$]: 0.1M | 2 | 25° C. | 15 |
| 5 «α-Tc barrier» | From 4 | [U(IV)]: 5 g/L [NHA]: 0.2M [HNO$_3$]: 1.5M | 1.5 | 25° C. | 30 |
| 6 «U stripping» | From 5 | [HNO$_3$]: 0.01M | 0.5 | 45° C. | 15 |

TABLE V

| | Contacts | | | | | |
|---|---|---|---|---|---|---|
| | 1 | 2 | 3 | 4 | 5 | 6 |
| [H$^+$]$_{aq.}$ (mol/L) | 5.8 | 2.5 | 0.59 | 0.16 | 1.4 | 0.083 |
| [U]$_{org.}$ (g/L) | 86 | 82 | | 91 | 65 | 10 |
| D$_U$ | 3.5 | 2.4 | 0.64 | 0.48 | 1.4 | 0.06 |
| D$_{Pu}$ | 1.1 | 0.41 | | 0.07 | | |
| D$_{(106Ru)}$ | 3.6 × 10$^{-4}$ | 0.16 | 0.41 | 0.53 | 3.5 | 4.2 |
| D$_{Tc}$ | 0.99 | 1.0 | 1.7 | 1.9 | 0.07 | |
| D$_{Np}$ | 1.2 | <0.14 | | | | |
| D$_{Zr}$ | 0.02 | | | | | |
| D$_{Mo}$ | <<0.01 | | | | | |
| D$_{Fe}$ | <<0.01 | | | | | |
| D$_{(134Cs)}$ | 2.0 × 10$^{-5}$ | | | | | |
| D$_{(137Cs)}$ | 2.5 × 10$^{-5}$ | 1.2 × 10$^{-4}$ | | | | |
| D$_{(144Ce)}$ | 1.4 × 10$^{-5}$ | | | | | |
| D$_{(154Eu)}$ | 1.6 × 10$^{-4}$ | | | | | |
| D$_{(241Am)}$ | 1.1 × 10$^{-4}$ | 0.41 | 0.44 | 0.51 | | |

These results confirm that an organic phase comprising 0.9 mol/L of DEHiBA and 0.5 mol/L of DEHBA in TPH allows an extraction of uranium(VI) and plutonium(IV) which is quantitative and selective with respect to the main fission products. High distribution coefficients (>1) were obtained for uranium(VI) and plutonium(IV) with 5.8 mol/L of HNO$_3$, despite the strong uranium saturation (86 g/L) in the organic phase, with U/PF and Pu/PF separation factors higher than 3000, particularly with respect to ruthenium.

They also confirm that plutonium(IV) can be selectively stripped from the organic phase (D$_{Pu}$=0.07) at the «Pu stripping» step using an aqueous nitric solution of weak acidity ([HNO$_3$]=0.16 M), whereas the uranium preferably remains held in the organic phase. The uranium can then be quantitatively stripped from the organic phase (D$_U$=0.06) at the «U stripping» step using an aqueous solution of very weak acidity ([HNO$_3$]=0.01 M), heated to 45° C.

II.2—Validation, Via a Test Conducted in Extractors, of the «α-Tc Barrier» Step of the Method of the Invention Reference is made to FIG. 2 illustrating the installation and operating conditions for performing a test intended to validate the «α-Tc barrier» step of the method of the invention in extractors.

As can be seen in this Figure, this test comprised:

a step denoted «Extraction» in FIG. 2, conducted in a first 8-stage mixer-settler unit intended to extract uranium and technetium from an aqueous solution denoted «Load» in FIG. 2, comprising 320 g/L of uranium, 279 mg/L of technetium 99m and 0.57 mol/L of HNO$_3$, using an organic phase comprising 0.9 mol/L of DEHiBA and 0.5 mol/L of DEHBA in TPH; the load composition and operating conditions under which «Extraction» was performed were chosen so as to obtain, after this step, an organic phase having a composition similar to that likely to be exhibited by the organic phase resulting from the «Pu stripping» step in the method of the invention;

a step denoted «α-Tc barrier» in FIG. 2, conducted in the last 8 stages of a second mixer-settler unit having 11 stages, and intended to strip the technetium from the organic phase resulting from the «Extraction» step using an aqueous solution comprising 1 mol/L of HNO$_3$, 5 g/L of U(IV) and 0.2 mol/L of hydrazinium nitrate (HN);

a step denoted «U washing» in FIG. 2, conducted in the first 3 stages of the second mixer-settler unit and intended to back-extract into the organic phase the uranium that was jointly stripped with technetium at the «α-Tc barrier» step, so as to limit leakage of uranium into the technetium stream; this step was performed using an organic phase having the same composition as the one used for the «Extraction» step;

a step denoted «U stripping» in FIG. 2, performed in a third mixer-settler unit having 5 stages, and intended to strip the uranium from the organic phase resulting from «α-Tc barrier» using an aqueous solution comprising 0.01 mol/L of HNO$_3$; and three washes of the organic phase resulting from «U stripping», respectively denoted «1$^{st}$ OP washing», «2$^{nd}$ OP washing» and «3$^{rd}$ OP washing» in FIG. 2, these being performed in 3 centrifuge extractors and consisting of washing this organic phase successively with an aqueous solution comprising 0.3 mol/L of sodium carbonate, an aqueous solution comprising 0.1 mol/L of sodium hydroxide and an aqueous solution comprising 2 mol/L of HNO$_3$ to re-acidify the organic phase for reuse thereof at the «Extraction» and «U washing» steps.

An aqueous solution comprising 1 mol/L of HNO$_3$, 50 g/L of U(IV) and 0.2 mol/L of HN was added to the 5$^{th}$ stage of the second unit (which therefore corresponds to the 2$^{nd}$ stage of the «α-Tc barrier» step) to maintain a minimum U(IV) concentration in the two first stages of «α-Tc barrier», since U(IV) is partly consumed over time in the loops of technetium reoxidation/reduction by nitric (and nitrous) acid and U(IV).

An aqueous solution comprising 10 mol/L of $HNO_3$ was also added to the $3^{rd}$ stage of the second unit to increase the acidity of the aqueous phase circulating in the 3 stages dedicated to «U washing» from 1 mol/L to 2.5 mol/L and thereby promote the back-extraction of the uranium into the organic phase.

An O/A flow ratio of 1 was applied in the 3 stages of «U washing», whereas an O/A flow ratio of 4 was applied in the 8 stages of «α-Tc barrier» to obtain a concentrating stripping of technetium. The temperature of the 8 stages of «α-Tc barrier» and of the 5 stages of «U stripping» was set at 40° C. to promote the stripping kinetics of technetium by U(IV) whilst limiting reoxidation phenomena of this element that are catalysed under a high temperature.

The test was conducted for 8.5 hours (of which 3 at equilibrium) starting from the time the load was loaded into the unit dedicated to the «Extraction» step.

Samples were taken every two hours to verify reaching of the thermodynamic equilibrium, after which the organic and aqueous phases were removed and analysed at the end of the test.

The results of this test are given in Table VI below.

TABLE VI

| Phase | U (g/L) | $H^+$ (mol/L) | Tc (Bq/L) | Tc (mg/L) | % Tc/load | $FD_{(U/Tc)}$ |
|---|---|---|---|---|---|---|
| Load | 320 | 0.57 | $6.7 \times 10^8$ | 246 | | |
| Raffinate | 0.28 | | $9.5 \times 10^3$ | 0.003 | 0.002% | |
| Aqueous phase resulting from «U washing» (or «Tc stream») | 10 | 2.07 | $4.0 \times 10^8$ | 143 | 112% | |
| Aqueous phase resulting from «U stripping» | 62.3 | 0.26 | $2.5 \times 10^5$ | 0.089 | 0.17% | 538 |
| Organic phase resulting from «$1^{st}$ OP washing» | 0.21 | | $3.4 \times 10^5$ | 0.122 | 0.03% | |
| Organic phase resulting from «$2^{nd}$ OP washing» | 0.07 | | $2.5 \times 10^4$ | 0.009 | 0.002% | |
| Recycled organic phase | | | $1.3 \times 10^4$ | 0.004 | 0.001% | |

These results show that the technetium, quantitatively extracted in the organic phase by the DEHiBA/DEHBA mixture at «Extraction», is then quantitatively stripped from this phase, selectively with respect to uranium, in the stages of «α-Tc barrier» by reduction of the oxidation state +VII to oxidation state +IV with the U(IV)/HN solution.

The stability of the concentration of U(IV) in the stages of «α-Tc barrier», observed under in-line spectrophotometric monitoring through the test, confirmed that the reoxidation phenomena of technetium and over-consumption of U(IV) were able to be prevented, thereby allowing efficient stripping of technetium from the organic phase throughout the entire duration of the test.

99.8% of the technetium initially contained in the load were recovered in the aqueous phase resulting from «U washing»; 0.17% were found in the aqueous phase resulting from «U stripping» and 0.02% in the organic phase resulting from this stripping.

The decontamination factor of uranium with respect to technetium ($FD_{U/Tc}$), calculated by dividing the ratio of uranium and technetium concentrations in the aqueous phase resulting from «U stripping» by the ratio of uranium and technetium concentrations in the load, was estimated to be 538 at the end of the test. The $FD_{U/Tc}$ value of 153 targeted for the aqueous phase resulting from the «U stripping» step of the method of the invention, which corresponds to a maximum concentration of technetium of 5 μg/g of uranium in this aqueous phase, was therefore reached.

II.3—Validation, Via Two Tests in Extractors, of the Method of the Invention as a Whole.

Figure 3:
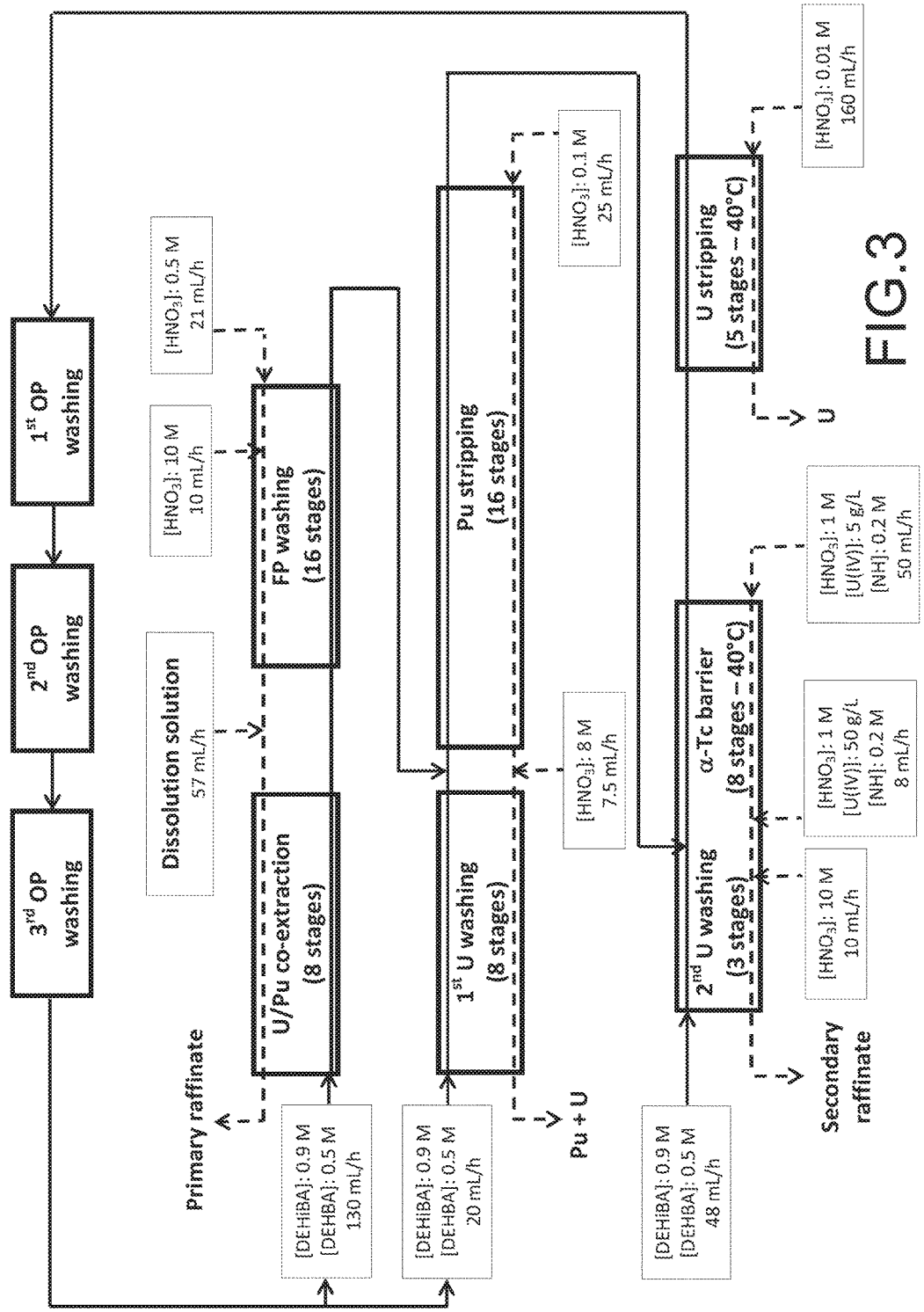
FIG. 3 schematically illustrates the installation and operating conditions used for two tests intended to validate the method of the invention as a whole in extractors.

Reference is made to FIG. 3 illustrating the installation and operating conditions used for two tests intended to validate the method of the invention as a whole, in extractors.

For these tests, the method of the invention was applied to the processing of an aqueous nitric solution resulting from the dissolution of spent nuclear fuels to obtain a first aqueous stream comprising a mixture of purified plutonium and purified uranium, and a second aqueous stream comprising purified uranium.

These tests were performed on an aqueous solution previously obtained from the dissolving in nitric acid of pellets from three different spent nuclear fuels: 75% of the dissolved fuel was UOX3 (burn-up=65 MWd/t, having cooled 4 years), the remaining 25% being composed of UOX with burn-up of 37 MWd/t, having cooled 7 years, and MOX with burn-up of 25 MWd/t, having cooled 18 years. The dissolution solution comprised 4.9 mol/L of $HNO_3$. Its element composition is given in Table VII below.

TABLE VII

| Element | Concentration (g/L) | Element | Activity (Bq/L) |
|---|---|---|---|
| U | 184 | $^{106}Ru$ | $1.35 \times 10^{11}$ |
| Pu | 2.85 | $^{134}Cs$ | $4.90 \times 10^{11}$ |
| Tc | 0.210 | $^{137}Cs$ | $1.23 \times 10^{12}$ |
| Np | 0.125 | $^{144}Ce$ | $1.10 \times 10^{11}$ |
| Zr | 0.989 | $^{154}Eu$ | $1.68 \times 10^8$ |
| Ru | 0.524 | $^{155}Eu$ | $4.50 \times 10^{10}$ |
| Mo | 0.939 | $^{241}Am$ | $9.90 \times 10^{10}$ |
| Pd | 0.437 | | |
| Sr | 0.255 | | |

The organic phases used comprised a DEHiBA/DEHBA mixture in the proportion of 0.9 mol/L of DEHiBA and 0.5 mol/L of DEHBA in TPH.

For this purpose, a shielded line was used comprising:
- a first mixer-settler unit of 8 stages for the «U/Pu co-extraction step»;
- a second mixer-settler unit of 16 stages for the «FP washing» step, the last four stages of this unit being dedicated to deacidification of the organic phase;
- a third mixer-settler unit of 16 stages for the «Pu stripping» step;
- a fourth mixer-settler unit of 8 stages for the «$1^{st}$ U washing» step;
- a fifth mixer-settler unit of 11 stages of which the first 3 stages were dedicated to the «$2^{nd}$ U washing» step and the last 8 stages to the «α-Tc barrier» step;

a sixth mixer-settler unit of 5 stages for the «U stripping» step; and three centrifuge extractors dedicated to three washes of the organic phase, respectively denoted «1$^{st}$ OP washing», «2$^{nd}$ OP washing» and «3$^{rd}$ OP washing» in FIG. 3, and consisting of washing this organic phase successively with an aqueous solution comprising 0.3 mol/L of sodium carbonate, an aqueous solution comprising 0.1 mol/L of sodium hydroxide and an aqueous solution comprising 2 mol/L of HNO$_3$ to re-acidify the organic phase for reuse thereof at the «U/Pu co-extraction» and «1$^{st}$ U washing» steps.

As under item 11.2 above:

an aqueous solution comprising 1 mol/L of HNO$_3$, 50 g/L of U(IV) and 0.2 mol/L of HN was added to the 5$^{th}$ stage of the second unit (which therefore corresponds to the 2$^{nd}$ stage of the «α-Tc barrier» step) to maintain a minimum U(IV) concentration in the two first stages of «α-Tc barrier»; whilst an aqueous solution comprising 10 mol/L of HNO$_3$ was also added to the 3$^{rd}$ stage of the fifth unit with 11 stages, to increase the nitric acid concentration of the aqueous phase circulating in the 3 stages dedicated to «2$^{nd}$ U washing» from 1 mol/L to 2.5 mol/L and thereby facilitate back-extraction of the uranium into the organic phase.

In addition, an aqueous solution comprising 8 mol/L HNO$_3$ was added to the aqueous solution resulting from «Pu stripping» when it entered the fourth unit dedicated to «1$^{st}$ U washing» to increase the concentration of nitric acid and facilitate the back-extraction of uranium into the organic phase.

The temperature of the 8 stages of «α-Tc barrier» and 5 stages of «U stripping» was set at 40° C.

The O/A flow ratios used at the steps «Pu stripping» and «U stripping» were respectively 6 and 1.24.

Initially, a first test was conducted for 80 hours.

After this test, the different aqueous and organic phases were collected and analysed to evaluate the performance of the method.

The results of these analyses are given in Table VIII below.

These results show that uranium and plutonium are quantitatively extracted (over 99.99% and 99.96% respectively) from the dissolution solution and then recovered in the aqueous phases resulting from the step «1$^{St}$ U washing» (or Pu+U stream) and from the step «U stripping» (or U stream).

The high selectivity of the DEHiBA/DEHBA mixture was confirmed by the very good decontamination of these phases with respect to the most problematic fission products (Ru, Cs, Tc, . . . ).

On leaving «FP washing», the decontamination of the organic phase with respect to ruthenium 106, the main contributor towards residual β-γ activity of the end products, is efficient since the decontamination factors reach $8 \times 10^5$ according to measurements taken on the organic phase sampled in the last stage of «FP washing».

Despite an over-estimation of β-γ activity in stream U on account of contamination problems on the shielded line (in particular evidencing by measurements of radiological blanks), the activity of ruthenium 106 measured in this aqueous solution practically reaches the ASTM C788-03 specification for decontamination of uranium, produced in the form of uranyl nitrate, with respect to ruthenium ($8 \times 10^5$ Mev·Bq/kgU for a targeted value of $3 \times 10^5$ Mev·Bq/kgU).

Regarding total β-γ activity, the ASTM specification is not reached on account of a strong caesium contamination on the shielded line, the radiological blank being of the same level as the measurement of caesium 137 activity in the U stream.

However, it is possible to base reasoning rather more on the organic activities measured in the organic phase resulting from «FP washing». The fact that the mixer-settler units positioned downstream of the extractor dedicated to the step «FP washing» exhibit γ activities that are largely higher than those measured in the organic phase resulting from this step can only be attributed to a contribution of γ activity by contaminations due to numerous operations performed throughout the test on the units dedicated to «1$^{st}$ U washing», «Pu stripping», «α-Tc barrier» and «U stripping».

Table IX below shows that, if consideration is given to the activities measured in Mev·Bq in the organic phase resulting from the «FP washing» step per gram of U or per gram of Pu contained in this phase (less perturbed by contaminations than the Pu+U stream and U stream), it is possible to reach ASTM C757-90 specifications for the Pu+U stream and to be very close thereto for the aqueous solution resulting from stream U (ASTM C788-03).

TABLE VIII

| Phase | U (g/L) | Pu (g/L) | Np (mg/L) | Tc (mg/L) | $^{106}$Ru (Bq/L) | $^{137}$Cs (Bq/L) | $^{134}$Cs (Bq/L) |
|---|---|---|---|---|---|---|---|
| Dissolution solution | 184 | 2.85 | 125 | 210 | $1.4 \times 10^{11}$ | $1.2 \times 10^{12}$ | $4.9 \times 10^{11}$ |
| Primary raffinate | 0.015 | $7.4 \times 10^{-4}$ | 3.2 | 54 | $8 \times 10^{10}$ | $8.5 \times 10^{11}$ | $3.1 \times 10^{11}$ |
| Organic phase of the last stage of the «FP washing» step | 83.0 | 1.22 | | | $7.7 \times 10^4$ | $4.0 \times 10^4$ | $5.4 \times 10^3$ |
| Aqueous phase resulting from the «1$^{st}$ U washing» step | 18.7 | 6.9 | 400 | 4.2 | $1.6 \times 10^6$ ($1.2 \times 10^5$)* | $1.1 \times 10^7$ ($3.0 \times 10^6$)* | $2.2 \times 10^6$ ($4.2 \times 10^5$)* |
| Secondary raffinate | 10.4 | 0.008 | 4.1 | 149 | $9.0 \times 10^4$ ($3.4 \times 10^5$)* | $3.3 \times 10^6$ ($1.3 \times 10^7$)* | $3.7 \times 10^5$ ($1.7 \times 10^6$)* |
| Aqueous phase resulting from the «U stripping» step | 53.7 | $6.7 \times 10^{-5}$ | 0.034 | 0.27 | $5.6 \times 10^5$ ($3.4 \times 10^5$)* | $1.1 \times 10^7$ ($1.0 \times 10^7$)* | $2.4 \times 10^6$ ($1.6 \times 10^6$)* |
| Organic phase resulting from the «U stripping» step | $<10^{-3}$ | $<5 \times 10^{-4}$ | | | $4.4 \times 10^5$ | $4.9 \times 10^4$ | $1.3 \times 10^4$ |

*radiological blank

TABLE IX

|  | $^{106}$Ru | $^{137}$Cs | $^{134}$Cs | Total γ | Total targeted γ (ASTM) |
|---|---|---|---|---|---|
| Activity (Bq/L) | $7.7 \times 10^4$ | $4.0 \times 10^4$ | $5.4 \times 10^3$ | | |
| Activity/g of Pu (Mev · Bq/gPu) | $1.3 \times 10^4$ | $2.0 \times 10^4$ | $6.9 \times 10^3$ | $4.0 \times 10^4$ | $1.0 \times 10^5$ |
| Activity/g of U (Mev · Bq/gU) | $1.9 \times 10^2$ | $2.9 \times 10^2$ | $1.0 \times 10^2$ | $5.8 \times 10^2$ | $3.0 \times 10^2$ |

Stream U is very well decontaminated with respect to:

plutonium since the concentration of plutonium in stream U is 67 µg/L, i.e. a $FD_{U/Pu}$ of 12 400 and a residual Pu activity of $1.5 \times 10^5$ Bq/gU for an ASTM standard of 125 Bq/gU;

neptunium since the concentration of neptunium in the U stream is 34 µg/L, i.e. a $FD_{U/Np}$ of 1 070 and a residual Np activity of 17 Bq/gU for an ASTM standard of 125 Bq/gU; and technetium since the concentration of technetium in the U stream is about 270 µg/L, i.e. a $FD_{U/Tc}$ of 230 and a residual Tc quantity of 5 µgTc/gU for an ASTM standard of 5 µgTc/gU, notably obtained by means of the «α-Tc barrier» step implemented downstream of U/Pu partitioning.

The ASTM specifications required for stream U are therefore reached, in particular if it is considered:

that the activities of β-γ emitters and the concentration of Pu measured in the U stream are essentially due to contaminations of samples taken on the shielded line;

that the conversion of uranyl nitrate to an oxide $U_3O_8$ will bring additional decontamination with respect to fission products (the purity of the uranium effectively being analysed on the final oxide); and that the fact that the test, for constraints related to analytical sensitiveness of ruthenium 106 in particular, was performed on a dissolution solution of spent nuclear fuels having scarcely cooled and hence with a very high β-γ emitter activity, i.e. pessimistic and restrictive conditions compared with usual operations in plants for the processing of spent nuclear fuel.

The Pu+U stream is also well decontaminated with respect to fission products. As is the case with the U stream, if consideration is given to total β-γ activity measured in the Pu+U stream at the end of the test, the ASTM specification is not reached for reasons related to contamination problems of mixer-settler units dedicated to «Pu stripping» and «$1^{st}$ U washing». However, if the β-γ activity measured in the organic phase resulting from the «FP washing» step is used as basis, the ASTM specification for total γ activity is reached ($4 \times 10^4$ ev·Bq/kgPu for a targeted value of $10^5$ Mev·Bq/gPu).

The Pu+U stream is very well decontaminated with respect to technetium since the concentration of technetium in the Pu+U stream is 4.2 mg/L, i.e. a $FD_{Pu/Tc}$ of 121 and a residual Tc quantity of 609 µg/gPu, largely below the limit of 6000 µg/gPu laid down by the ASTM standard for plutonium oxide.

Finally, the concentration of uranium in the Pu+U stream measured at the end of the test was higher than the targeted Pu/U ratio, but this is due to a dysfunction of the flow of aqueous $HNO_3$ solution added to the aqueous solution resulting from «Pu stripping», when entering the fourth unit dedicated to «$1^{st}$U washing».

A second test was therefore conducted on the same installation and under the same operating conditions, but by correcting this dysfunction. This test was conducted for 74 hours. At the end of this test, the thermodynamic equilibrium was reached and the different aqueous and organic phases were collected and analysed.

This second test not only confirmed the good decontamination of the U and Pu+U streams with respect to fission products, but also feasibility of U/Pu partitioning without reducing plutonium. Plutonium was quantitatively stripped and recovered at the end of the test, and the Pu+U stream comprised 5.45 g/L of Pu and 2.07 g/L of U, i.e. a U/Pu ratio of 0.38 conforming to the targeted Pu/U ratio.

The tests described in the foregoing show the possibility of recovering, separating and decontaminating uranium and plutonium contained in an aqueous nitric solution resulting from the dissolution of spent nuclear fuels, in one processing cycle without having recourse to reductive stripping of plutonium and with decontamination factors of uranium and plutonium, in particular with respect to β-γ emitters, that are such that it is not necessary to make provision for additional purification cycles of uranium and plutonium.

CITED REFERENCES

[1] FR-A-2 591 213
[2] FR-A-2 642 561
[3] FR-A-2 642 562

What is claimed is:

1. A method for processing in one cycle an aqueous solution resulting from a dissolution of a spent nuclear fuel in nitric acid, the aqueous solution comprising uranium, plutonium, americium, curium and fission products including technetium, the cycle comprising:

a) a co-extraction of uranium and plutonium from the aqueous solution, the co-extraction comprising at least one contacting, in an extractor, of the aqueous solution with a first organic solution comprising from 1 mol/L to 2 mol/L of N,N-di(2-ethylhexyl)-3,3-dimethylbutanamide or a mixture of N,N-di(2-ethylhexyl)-isobutanamide and N,N-di(2-ethylhexyl)-n-butanamide as extractant, in solution in an organic diluent, followed by a separation of the aqueous solution from the organic solution;

b) a decontamination of the organic solution resulting from a) with respect to americium, curium and fission products, the decontamination comprising at least one contacting, in an extractor, of the organic solution resulting from a) with an aqueous solution comprising from 0.5 mol/L to 6 mol/L of nitric acid, followed by a separation of the organic solution from the aqueous solution;

c) a partitioning of the uranium and plutonium contained in the organic solution resulting from b) into an aqueous solution and an organic solution, the aqueous solution comprising either plutonium without uranium, or a mixture of plutonium and uranium, and the organic solution comprising uranium without plutonium, the partitioning comprising:

c₁) a stripping of plutonium, in oxidation state +IV, and of a fraction of uranium from the organic solution resulting from b), the stripping comprising at least one contacting, in an extractor, of the organic solution resulting from b) with an aqueous solution comprising from 0.1 mol/L to 0.5 mol/L of nitric acid, followed by a separation of the organic solution from the aqueous solution;

c₂) an extraction of all or part of the uranium fraction contained in the aqueous solution resulting from c₁), the extraction comprising at least one contacting, in an extractor, of the aqueous solution resulting from c₁) with a second organic solution identical to the first organic solution, followed by a separation of the aqueous solution from the second organic solution;

d) a decontamination of the organic solution resulting from c₁) with respect to technetium, the decontamination comprising:

d₁) a stripping of technetium, in oxidation state +IV, from the organic solution resulting from c₁), the stripping comprising at least one contacting, in an extractor, of the organic solution resulting from c₁) with an aqueous solution comprising from 0.1 mol/L to 3 mol/L of nitric acid and at least one reducing agent capable of reducing technetium from oxidation state +VII to oxidation state +IV, or a complexing agent capable of stabilising technetium in aqueous phase, followed by a separation of the organic solution from the aqueous solution;

d₂) an extraction of the uranium fraction contained in the aqueous solution resulting from d₁), the extraction comprising at least one contacting, in an extractor, of the aqueous solution resulting from d₁) with a third organic solution identical to the first organic solution, followed by a separation of the aqueous solution from the third organic solution;

e) a stripping of uranium from the organic solution resulting from d₁), the stripping comprising at least one contacting, in an extractor, of the organic solution resulting from di) with an aqueous solution comprising no more than 0.05 mol/L of nitric acid, followed by a separation of the organic solution from the aqueous solution; and f) a regeneration of the organic solution resulting from e); whereby a first and second aqueous solution are obtained, decontaminated with respect to americium, curium and fission products including technetium, the first aqueous solution comprising plutonium without uranium or a mixture of plutonium and uranium, and the second aqueous solution comprising uranium without plutonium.

2. The method of claim 1, wherein the first organic solution comprises from 1.3 mol/L to 1.4 mol/L of N,N-di(2-ethylhexyl)-3,3-dimethyl-butanamide.

3. The method of claim 1, wherein the first organic solution comprises from 1.35 mol/L to 1.45 mol/L of the mixture of N,N-di(2-ethylhexyl)-isobutanamide and N,N-di-2(ethylhexyl)-n-butanamide.

4. The method of claim 3, wherein the molar ratio of N,N-di(2-ethylhexyl)-isobutanamide to N,N-di-2(ethylhexyl)-n-butanamide in the first organic solution is 1.75 to 1.85.

5. The method of claim 4, wherein the first organic solution comprises 0.9 mol/L of N,N-di(2-ethylhexyl)-isobutanamide and 0.5 mol/L of N,N-di(2ethylhexyl)-n-butanamide.

6. The method of claim 1, wherein the aqueous solution of b) comprises from 4 mol/L to 6 mol/L of nitric acid.

7. The method of claim 6, wherein b) further comprises a deacidification of the organic solution resulting from a), the deacidification comprising at least one contacting of the organic solution resulting from a) with an aqueous solution comprising no more than 1 mol/L of nitric acid, followed by a separation of the organic and aqueous solutions.

8. The method of claim 1, wherein the contacting of the organic and aqueous solutions in the extractor of c₁) comprises a circulation of the organic and aqueous solutions with a ratio of the flow of the organic solution to the flow of the aqueous solution higher than 1.

9. The method of claim 1, wherein the reducing agent of d₁) is uranous nitrate, hydrazinium nitrate, hydroxylammonium nitrate, acetaldoxime or a mixture thereof.

10. The method of claim 1, wherein the extractor of d₁) is heated to a temperature of 30° C. to 40° C.

11. The method of claim 1, wherein d₂) comprises an acidification of the aqueous solution resulting from d₁) to bring the concentration of nitric acid in the aqueous solution resulting from d₁) to a value of at least 2.5 mol/L, the acidification comprising the addition of nitric acid to the extractor of d₂).

12. The method of claim 1, wherein the extractor of e) is heated to a temperature of 40° C. to 50° C.

13. The method of claim 1, wherein the contacting of the organic and aqueous solutions in the extractor of e) comprises a circulation of the organic and aqueous solutions with a ratio of the flow of the organic solution to the flow of the aqueous solution higher than 1.

14. The method of claim 1, wherein the regeneration of the organic solution resulting from e) comprises at least one washing of the organic solution resulting from e) with a basic aqueous solution, followed by at least one washing of the washed organic solution with an aqueous solution of nitric acid.

15. The method of claim 1, wherein the organic solution resulting from f) is divided into a first and a second fraction, the first fraction forming the first organic solution of a) and the second fraction forming the second organic solution of c₂).

* * * * *

UNITED STATES PATENT AND TRADEMARK OFFICE
CERTIFICATE OF CORRECTION

PATENT NO. : 10,249,396 B2
APPLICATION NO. : 15/747713
DATED : April 2, 2019
INVENTOR(S) : Manuel Miguirditchian et al.

It is certified that error appears in the above-identified patent and that said Letters Patent is hereby corrected as shown below:

In the Specification

Column 9, Line 31, "1St" should be -- $1^{st}$ --.

Signed and Sealed this
Eleventh Day of June, 2019

Andrei Iancu
*Director of the United States Patent and Trademark Office*